United States Patent [19]
Klein et al.

[11] 3,859,656
[45] Jan. 7, 1975

[54] INSTRUSION DETECTION MEANS HAVING CYCLE COUNTING INTERLOCK RESPONSE CONTROL MEANS

[75] Inventors: Carl F. Klein; James R. Bailey, both of Milwaukee, Wis.

[73] Assignee: Johnson Service Company, Milwaukee, Wis.

[22] Filed: Aug. 3, 1972

[21] Appl. No.: 277,494

[52] U.S. Cl. .............................................. 343/5 PD
[51] Int. Cl. .................... G08b 13/22, G01s 9/02
[58] Field of Search........................... 343/5 PD, 7.7

[56] References Cited
UNITED STATES PATENTS

| | | | |
|---|---|---|---|
| 3,680,074 | 7/1972 | Lieser............................ | 343/5 PD X |
| 3,703,722 | 11/1972 | Gershberg et al. ................ | 343/5 PD |
| 3,706,961 | 12/1972 | Sugiura.......................... | 343/5 PD X |
| 3,727,216 | 4/1973 | Antonio.......................... | 343/5 PD |
| 3,728,721 | 4/1973 | Lee et al......................... | 343/5 PD |

Primary Examiner—T. H. Tubbessing
Attorney, Agent, or Firm—Andrus, Sceales, Starke & Sawall

[57] ABSTRACT

A Doppler motion frequency signal is generated by the movement of an intruder in a radio frequency energy field. The signal is to establish a series of related pulses which are simultaneously applied to all clock inputs of a shift register and to a timer. An alarm signal line is connected to any one of the shift register outputs and a reset signal line is connected from the next output. The timer preferably employs a programmable unijunction transistor and a predetermined time after a last pulse occurs generates a reset pulse to reset the shift register and initiate a new counting cycle. A predetermined number of cycles must occur within a predetermined time which is less than the normal timing cycle of the timer in order to prevent the timer from triggering and resetting the counting device.

14 Claims, 1 Drawing Figure

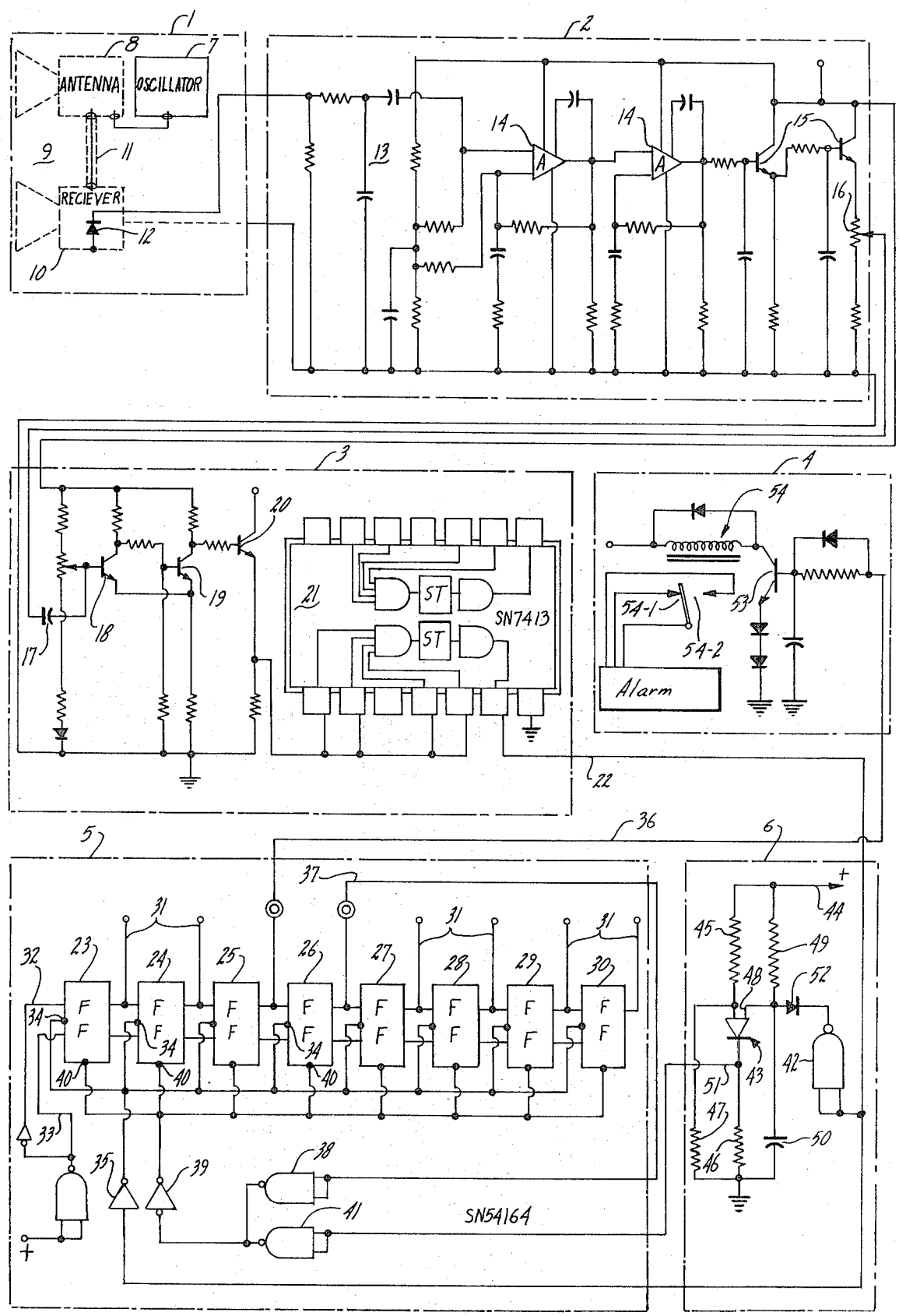

INSTRUSION DETECTION MEANS HAVING CYCLE COUNTING INTERLOCK RESPONSE CONTROL MEANS

BACKGROUND OF THE INVENTION

The present invention relates to an intrusion detection means having a counting interlock means to restrict alarm response to a preselected minimum number of motion signals.

Intrusion detection devices have been developed to detect movement within restricted areas. A highly satisfactory system is based on the Doppler motion principle wherein a radio frequency field is radiated into the restricted area with movement of a person or other object within the field establishing a reflected energy signal which is received and mixed with the radiated energy to create a Doppler frequency signal. A satisfactory system is shown in U.S. Pat. 3,242,486 wherein essentially a single cycle of a Doppler frequency which is of a predetermined magnitude is operative to trigger the alarm and thereby provides a very sensitive response. One difficulty, of course, with a system set to respond to a single Doppler cycle is the danger of triggering the alarm as the result of a Doppler frequency signal of a sufficient magnitude which is generated by other causes than the unauthorized movement of an individual or object within the restricted areas. Transistory vibrations such as associated with air turbulence and spurious movement of an object as a result of air turbulence and the like as well as noise signals within the circuitry have been found to trigger the alarm. For example, in a junk yard or the like, the intrusion detection apparatus should distinguish between a piece of metal which is moving as the result of air movement and the movement of an intruder through an aisle area. Various systems have been suggested to eliminate spurious signal alarms, generally based on the integration of the alarm signals at a fixed rate such that a selected plurality of Doppler cycles are required to register an alarm. For example, U.S. Pat. 3,331,065 employs a Doppler motion threshold sensing device driving a capacitive storage memory device to provide accumulation of the alarm signals during a sampling interval. The capacitive system has a time constant such that the discharge between sampling intervals should eliminate the possibility of spurious signals building up the number of events sufficient to cause alarm of the system. The capacitor does not completely discharge between sampling intervals. Intruder related signals over a plurality of sampling cycles should result in the accumulation of a signal in the memory device to actuate the alarm, according to the teaching of the patent.

SUMMARY OF THE PRESENT INVENTION

The present invention is particularly directed to an intrusion detection system responding to periodic signals generated by movement within the protected field and includes a means to detect alarm signals and connected whereby a preselectable number of Doppler cycles at a selected minimum preiodic rate or frequency are required before an alarm is generated in combination with a timer control means to eliminate the effect of selected signals and thereby the triggering in response to spurious signals. The present invention increases the reliability and has been found to significantly reduce the probability of nuisance alarm as the result of vibration and transient movements within the area being protected as well as noise pulse signals generated within the electronic circuitry of the intrusion detection signal processing circuit. Generally, in accordance with the present invention, the alarm signals are connected to a sequence counting means having an output alarm line and a reset input. A count reset timer means is connected to reset the counting after a selected period. Generally, the number of noise signals of sufficient magnitude to actuate the alarm counting system will not occur within the set time of the timer means and, consequently, this system is set up to count the number of pulses occurring within a given time period associated only with alarm conditions. The counting means or device will count continuously. If, within a given period, after a last effective count, another alarm signal is not received, the timer times out and resets the counting means to the initial starting position. This action prevents the accumulation of random pulses. However, motion of an intruder will normally generate a series of signals which will be transmitted to the counting device, with the sequential signals established in less than the normal cycle of the timer and thus continuously resets the timer. Consequently, the counting device will sequence to activate the output line and operate the alarm system.

In accordance with a preferred and particularly novel construction of the invention, the energy field is established through any suitable system with the Doppler motion frequency signal amplified and processed in the normal manner to a threshold detector, the output of which is a series of pulses related to the Doppler motion generated signals. These signals are simultaneously applied to the clock input of a shift register having an output terminal means for each stage of the shift register. The alarm signal line is connected to any one of the shift register output terminal means depending upon the number of pulses to be required to trigger the alarm. Further, a reset signal line is connected from the terminal means following the selected triggering alarm output terminal means such that after the alarm the next Doppler motion frequency signal will reset the counting circuit to zero. In addition, the Doppler frequency alarm signals are simultaneously impressed upon the stage of the logic gate such as a NAND gate and through a steering diode to the input of a relaxation oscillator timer to continuously restart the timer with each alarm signal. The relaxation oscillator timer preferably employs a programmable unijunction transistor as its active element with a timing capacitor reset by each of the alarm signals. A predetermined time after a last pulse occurs, the programmable unijunction transistor will cycle and generate a pulse output signal which is connected through suitable logic circuitry to the reset input of the shift register to thereby reset the shift register to the zero position and initiate a new counting cycle.

Thus a predetermined number of cycles must occur within a predetermined time which is less than the normal timing cycle of the timer in order to prevent the timer from triggering and resetting the counting device. The particular number of cycles required can, of course, be directly adjusted by selective connection of the alarm line to any one of the output terminals or stages of the shift register with the corresponding repositioning of the reset line in the preferred construction.

Applicants have found that this system significantly increases the reliability of the system and correspondingly reduces the probability of spurious alarms as the result of vibration motion and transient signals as well as noise pulses in the processing circuitry and the like.

BRIEF DESCRIPTION OF THE DRAWING

The drawing furnished herewith illustrates a preferred construction of the present invention in which the above advantages and features are clearly disclosed as well as others which will be readily understood from the description of such illustrated embodiment.

The drawing is a schematic circuit diagram of a Doppler motion intrusion alarm system incorporating the counting and timer interlock system of the present invention.

DESCRIPTION OF THE ILLUSTRATED EMBODIMENT

Referring to the drawing, the illustrated embodiment of the invention is shown including a conventional, well-known detector assembly 1 which is adapted to generate Doppler motion frequency signals to detect movement within a given area. The signals are connected to an amplifier 2, the output of which is applied to a threshold detector circuit 3. Thus, motion alarm signals of a predetermined minimum amplitude are transmitted from the circuit 3 and constitute alarm level signals. These signals are coupled to actuate an alarm circuit 4 through a counting circuit 5 which requires a predetermined number of the alarm signals before the alarm circuit 4 is actuated. A timer 6 is connected to the output of the circuit 3 in common with the counting circuit 5 and is continuously reset by each of the alarm signals. The timer 6, in turn, is connected to reset the counting circuit 5 upon timing out of the timer. Thus, the counting circuit 5 is in condition to continuously count all of the generated alarm signals. Generally, spurious and transient signals such as associated with vibrational motion, transient or noise signals within the active circuitry will not occur in sufficient number within a given time period to trigger the alarm. However, motion related intrusion signals will occur in sufficient number to drive the counting circuit 5 to an alarm state and thereby actuate the alarm circuit 4 before the timer 6 times out to reset the counting circuit.

More particularly, in the illustrated embodiment of the invention, a conventional motion detector assembly 1 is shown including a suitable separate microwave oscillator 7 coupled to a transmitting antenna assembly 8. The output of the antenna establishes a radio frequency energy field within a selected area 9 which constitutes the restricted area. A separate receiving antenna unit 10 is shown mounted within the area 9 to pick-up the Doppler motion signals or the reflected energy of an intruder within the restricted area 9. A line 11 also couples the transmitted energy to the receiving antenna unit 10 where the reflected signals and the transmitted signals are mixed through a suitable mixer diode 12 or other suitable means to establish an output signal including the transmitted and received signals as well as the difference signal which constitutes the Doppler motion frequency signal. The components of the motion detector assembly are shown as various several individual units and are shown in block diagram because of the great variety of circuits which can, of course, be employed. For example, although separate elements are disclosed an oscillator-mixer with a common transmitting and receiving antenna can be employed, for example, as shown in the U.S. Pat. No. 3,668,703 issued to Carl F. Klein for a "MOTION DETECTOR" on June 6, 1972 and assigned to a common assignee with the present application. In any event, the assembly 1 is such as to generate a signal including the Doppler motion frequency signal which is applied to the amplifying stage or circuit 2 which includes a filtering input network 13, a pair of active amplifying units 14 interconnected to filter the incoming signal and transmit only the difference frequency signals to a cascaded pair of emitter follower transistors 15. The amplified difference frequencies are taken from the emitter resistor 16 in the last stage 15, which is shown including a potentiometer to provide adjustment of the threshold level. This amplified signal is coupled through a capacitor 17 to the triggered circuit 3 which includes a pair of differential transistors 18 and 19 connected to an emitter follower coupling transistor 20, the output of which is connected as the input to a known integrated Schmitt trigger circuit 21, identified by the number Ser. No. 7413. A common output line 22 connects the circuit 21 to circuits 5 and 6. The circuit 3 converts the difference frequency signal of a selected minimum amplitude into a related pulse signal suitable for driving of the counting and timing circuits 5 and 6, which circuits particularly form the novel subject matter of the illustrated embodiment of the invention.

In particular the counting circuit 5 is positive step-type counting means shown as a known shift register unit, such as an Ser. No. 54164 shift register assembly. The shift register includes a plurality of clock stages 23 through 30, inclusive, to establish a counting system which counts from one to eight. Each stage 23 – 30 is provided with a separate output terminal means or line 31 connected to the interstage coupling line between the logic output and the set input of the subsequent stage. The stages 23 – 30 of the shift register are of course connected in accordance with the usual manner to a pair of serial inputs 32 and 33 interconnected to each other through a suitable logic circuit and to a suitable positive low voltage bias supply. In addition, the clock input means 34 of the several stages are connected in common to an input inverter 35 which, in turn, is connected to the output line 22 of the threshold circuit 3. Thus each alarm pulse signal is transmitted to the clock input of the several clock stages and is effective to transfer the active state of a stage to the subsequent stage and to turn off the previously activated stage. This provides for the automatic stepping from the initial stage 23 through the successive stages 24 – 30 to sequentially activate the corresponding output lines 31.

An alarm signal line 36 is releasably connected to a selected one of the output lines 31 as by a releasable connector to transfer the signal from that stage to the alarm circuit 4. Thus by selective positioning of the alarm line 36 the particular number of counts, and thus of alarm signals, which must be received is selectively controlled. When that number of alarm signals is established at a sufficiently rapid rate the alarm circuit will, of course, be activated.

As described, the alarm circuit 4 includes a selflatching system and in the illustrated embodiment of the invention, the next alarm pulse or signal is transmitted through the shift register to activate the next output signal line 31 and establish a reset of the shift register as follows.

A reset line 37 is correspondingly releasably connected to the next output line 31 of the next succeeding shift register stage. A NAND gate 38 connects the line 37 to an inverter 39, the output of which is connected in common to the clear terminals 40 of the several stages 23 – 30. The shift register is then reset automatically with the alarm system being locked in through its self-latching system.

The shift register can also be reset as a result of a signal from the timer 6 which is interconnected to the inverter 39 by a NAND gate 41. As previously noted, the timer 6 is connected in common to the output line 22 with the counting circuit 5. The timer 6 resets each time an alarm pulse is received and the timer only establishes a reset signal if the alarm signals are below a preselected periodic rate or frequency.

The illustrated timer in particular includes a NAND gate 42 connected to the output line 22 of the circuit 3 and is interconnected to control the firing of a programmable unijunction transistor 43 such as a 2N6027 transistor, which is interconnected to form a relaxation oscillator timer in the illustrated embodiment of the invention. Thus, the transistor 43 has its base-to-base electrodes connected between a positive power supply line 44 and a reference or ground with the usual interelectrode resistors 45 and 46 connected in series with the opposite base electrodes. In addition, a stabilizing resistor 47 is connected across the interbase electrodes and the resistor 46 to ground. The triggering electrode or emitter 48 of the transistor 43 is connected to the junction of a resistor 49 and a capacitor 50 which are connected in series between the positive power supply line 44 and ground. Thus, in accordance with the usual relaxation oscillator construction, the capacitor 50 will tend to charge to the firing level and turn on the unijunction transistor 43 after a predetermined time. The transistor 43 will then conduct and establish a signal on the output line 51, connected to the top side of the resistor 46, to provide a positive reset signal through the NAND gate 41 to the clear terminal 40 of shift register stages 23 – 30. However, the emitter is also connected via a diode 52 to the NAND gate 42 to receive each alarm signal. This will provide a discharge path for the capacitor 50 and reset the timing circuit. If no further alarm signals are received within a given time, capacitor 50 charges to a level sufficient to fire the transistor 43 and transfer a reset pulse via the NAND gate 41 to the clock register stages 23 – 30 thereby resulting in an automatic resetting of the shift register stages 23 – 30, such that the circuit 5 begins again counting from zero.

If a sufficient number of pulses are received in a given predetermined period of time, an alarm signal is generated at alarm line 36 which is applied to the alarm circuit 4.

The illustrated alarm circuit includes a transistor 53 connected to control the energization of a low voltage relay 54. The relay is shown as a multiple contact relay having normally closed contacts 54-1 connected to deactivate a suitable alarm means such as a bell, lamp or the like. Thus, by opening contacts 54-1, the alarm is energized. Latching contacts 54-2 provide interlocking circuitry to maintain energization of the alarm means after removal of the alarm signal from alarm line 36, in accordance with any wellknown construction.

In summary, the motion detector assembly 1 is mounted within the area 9 to be protected and an energy field is established by suitable activation of the transmitting antenna 8. The receiving antenna 10 mixes the transmitted signal with any reflected signals and generates a corresponding output which, after suitable filtering and amplification by the circuit 2, is applied to the threshold detection circuit 3. This results in a train of pulses or signals related to alarm level signals and based on Doppler motion detection principles. This train of signals is simultaneously applied to the counting circuit 5 and the timer 6. Each new alarm signal in the illustrated embodiment establishes a new detection time period. It is assumed that if a second alarm signal is not generated within a predetermined time as set by the timer 6, that the first signal was not a true alarm signal but rather a transient or spurious signal. Consequently, the timer 6 will time out, reset the counting circuit 5 and require a complete new alarm cycle. If, however, a selected number of alarm signals are generated in close sequence and thus at a sufficient rate as determined by the timer 6, the counting circuit 5 will be stepped to establish an alarm signal. This then provides a means for distinguishing between random generated signals and a plurality of signals associated with actual unwarranted intrusion into the area. The time period within which the signals must be established may be adjustable through a programmable timer 6. Further, the number of pulses associated with an actual unwarranted condition is preselectable by the selective connection of the line 36 to the several output stages.

Applicants have found that the present invention provides a very reliable control while significantly reducing the probability of nuisance alarm as a result of spurious signals such as vibrational motion, transient signals in the area and/or noise pulses generated within the intrusion detection circuit.

Various modes of carrying out the invention are contemplated as being within the scope of the following claims, particularly pointing out and distinctly claiming the subject matter which is regarded as the invention.

We claim:

1. An intrusion detection apparatus wherein the movement of an object within a selected secured area generates a series of pulse signals related to such movement, comprising counting means to detect the number of said pulse signals and having an output means activated in response to a selected predetermined plurality of said signals, a timing control means operable to control said counting means to eliminate the effect of the receipt of selected signals and operably disabled in response to said pulse signals to require a subsequent receipt of said predetermined plurality of said signals to activate said output means, said counting means to detect the number of said pulses including a clock counter having a plurality of counting stages and establishing a corresponding plurality of related output connection means, said output means being selectively connected to one of said output connection means to respond to a corresponding count, and said counter having a counter reset means connected to a subsequent connection means following the connection means connected to said output means.

2. An intrusion detection apparatus wherein an intruding body generates a series of alarm signals, comprising a counting means for counting the number of said alarm signals and retaining the count until said counting means is positively reset, said counting means having a counter reset means, output means connected to said counting means, a timing means having a starting time condition and establishing periodic time spaced output signals from said starting time condition and connected to said counter reset means, said timing means having a timing reset means to reset the timing means to said starting time condition during a timing cycle, and an input circuit means for coupling of said alarm signals to said counting means and said timing means for receiving each of said signals and simultaneously actuating said counting means to count the alarm signals and selectively resetting said timing means to its starting time condition in response to receipt of the alarm signals and whereby said alarm is actuated if the counting rate is sufficiently great to prevent the timer from timing out.

3. The intrusion detection apparatus of claim 2 wherein said timing reset means is constructed to respond to each of said alarm signals and resets the timing means to thereby initiate a new timing period.

4. The detection apparatus of claim 2 wherein said counting means includes a clock counter having a plurality of counting stages and establishing a corresponding plurality of related output connection means, said output means being selectively connected to one of said connection means to respond to a corresponding count.

5. The detection apparatus of claim 4 wherein said counter reset means is connected to a succeeding output connection means following the connection means connected to said output means.

6. The detection apparatus of claim 5 wherein said reset means is connected to the immediate next succeeding output connection means.

7. The intrusion detection apparatus of claim 2 comprising a transmitting and receiving means for establishing electromagnetic transmitted energy as a field within a secured area and for receiving of reflected energy from a moving body within said field, means for mixing of said transmitted and reflected energy to establish an intermediate related beat frequency and to establish a rectified output signal, means to amplify said rectified output signal, a triggered threshold detector to establish a pulse signal for each amplified signal of a preselected minimum amplitude to form said series of alarm signals.

8. The detection apparatus of claim 2 wherein said counting means is a shift register having a plurality of count stages interconnected for sequential turn on in response to a common clock input line connected to said input circuit means and interconnected to a common reset line for resetting of the on-stage in response to a signal at the reset line, each of said stages including an output terminal means, said output means being releasably connected to one of said output terminal means and energized in response to a corresponding turn-on of the count stage.

9. The detection apparatus of claim 8 wherein said shift register includes a selection reset line connected to said common reset line and selectively connected to the output terminal means of a stage following the output energizing stage.

10. The detection apparatus of claim 2 wherein said timing means including a programmable unijunction transistor connected in a relaxation oscillator circuit to produce a periodic output signal and connected to said counting means, and
said input circuit means being connected to said relaxation oscillator to reset the oscillator to a start condition in response to each alarm signal.

11. The detection apparatus of claim 2 wherein said counting means is a shift register having a plurality of count stages interconnected for sequential turn on in response to a common clock input line connected to said input circuit means and each stage has a counter reset means interconnected by a common reset line to said timing means for resetting of the on-stage in response to a signal at the reset line, each of said stages including an output terminal means,
said output means including a self-latching alarm circuit and a switching circuit connected to one of said output terminal means and energized in response to a corresponding momentary turn-on of the count stage, and
said shift register including a selection reset line connected to said common reset line and selectively connected to the output terminal of the stage immediately following the output energizing stage.

12. The detection apparatus of claim 11 wherein said timing reset means responds to each alarm signal.

13. The detection of apparatus of claim 2 wherein said counting means is a shift register having a plurality of count stages interconnected for sequential turn-on in response to a common clock input line connected to said input circuit means and interconnected to a common reset line for resetting of the onstage in response to a signal at the reset line, each of said stages including an output terminal,
said output means being connected to one of said output terminals and energized in response to a corresponding turn-on of the count stage,
a selection reset line connected to said common reset line and selectively connected to the output terminal of the stage immediately following the output energizing stage,
said timing means including a programmable unijunction transistor connected in a relaxation oscillator circuit to produce a periodic output signal and connected to said common reset line, and
said input circuit means being connected to said relaxation oscillator to reset the oscillator to a start condition.

14. The intrusion detection apparatus of claim 13 including a transmitting and receiving means for establishing electromagnetic transmitted energy as a field within a secured area and for receiving of reflected energy from a moving body within said field, means for mixing of said transmitted and reflected energy to establish an intermediate related beat frequency and to establish a rectified output signal, a threshold detector to establish an alarm signal for each output signal of a preselected minimum amplitude.

* * * * *